(12) United States Patent
Butani et al.

(10) Patent No.: US 12,281,971 B2
(45) Date of Patent: Apr. 22, 2025

(54) SYSTEM AND METHOD FOR A SPECIMEN CONTAINER FOR USE IN CABINET X-RAY SYSTEMS

(71) Applicant: KUB Technologies Inc., Stratford, CT (US)

(72) Inventors: Vikram Butani, Stratford, CT (US); Chester Lowe, Stratford, CT (US)

(73) Assignee: KUB Technologies Inc., Stratford, CT (US)

( * ) Notice: Subject to any disclaimer, the term of this patent is extended or adjusted under 35 U.S.C. 154(b) by 0 days.

(21) Appl. No.: 18/514,077

(22) Filed: Nov. 20, 2023

(65) Prior Publication Data

US 2024/0085284 A1  Mar. 14, 2024

Related U.S. Application Data

(63) Continuation-in-part of application No. 18/098,106, filed on Jan. 17, 2023, now abandoned.

(60) Provisional application No. 63/299,507, filed on Jan. 14, 2022.

(51) Int. Cl.
   *G01N 1/36* (2006.01)
   *G01N 23/04* (2018.01)

(52) U.S. Cl.
   CPC .............. *G01N 1/36* (2013.01); *G01N 23/04* (2013.01); *G01N 2223/1016* (2013.01); *G01N 2223/307* (2013.01); *G01N 2223/309* (2013.01)

(58) Field of Classification Search
   CPC .. G01N 1/36; G01N 23/04; G01N 2223/1016; G01N 2223/307
   USPC .......................................................... 235/492
   See application file for complete search history.

(56) References Cited

U.S. PATENT DOCUMENTS

| | | | |
|---|---|---|---|
| 2016/0031605 A1* | 2/2016 | Bean | B65D 85/70 206/1.5 |
| 2016/0341665 A1* | 11/2016 | Nagatomi | G02B 21/34 |
| 2018/0259762 A1* | 9/2018 | Fujimoto | G01N 21/6428 |
| 2019/0285558 A1* | 9/2019 | Defreitas | A61B 6/463 |
| 2020/0211697 A1* | 7/2020 | Adiri | A61B 5/1034 |
| 2023/0136395 A1* | 5/2023 | Chen | G06T 5/90 378/62 |
| 2023/0384243 A1* | 11/2023 | Lowe | G01N 23/04 |
| 2024/0074714 A1* | 3/2024 | Van Holen | A61B 6/037 |
| 2024/0248012 A1* | 7/2024 | Taft | G01N 29/07 |

* cited by examiner

*Primary Examiner* — Allyson N Trail
(74) *Attorney, Agent, or Firm* — Ziegler IP Law Group (57) ABSTRACT

A specimen platform for maintaining specimen geometry and traceability includes a specimen holder having a specimen receptacle comprising a flexible X-ray and optically transparent material, configured to conform an excised specimen to a shape of the specimen before excision, a specimen receptacle support attached to the specimen receptacle, and a frame configured to hold the specimen receptacle support.

14 Claims, 8 Drawing Sheets

SYSTEM AND METHOD FOR A SPECIMEN CONTAINER FOR USE IN CABINET X-RAY SYSTEMS

CROSS-REFERENCE TO RELATED APPLICATIONS

This application is a continuation in part of U.S. patent application Ser. No. 18/098,106 filed Jan. 17, 2023, which claims priority to and the benefit of U.S. Provisional Patent Application Ser. No. 63/299,507 filed Jan. 14, 2022, the disclosure of all of which are incorporated herein by reference in their entirety.

TECHNICAL FIELD

The disclosed embodiments relate to the field of specimen x-ray imaging, in particular to a system and method for maintaining specimen shape, geometry and integrity while taking a series of x-ray or optical images and for providing traceability of the specimen.

BACKGROUND

X-ray imaging is an important diagnostic tool for detecting tumors and other masses, foreign objects, and other tissue abnormalities, and typically uses low-dose X-rays to create images of the tissue under examination for identifying changes or irregularities. However, X-ray radiograms often fail to provide critical information pertaining to details of the abnormality and other characteristics. As a result, upon detection of one or more abnormalities, it may be necessary to X-ray excised tissue including and surrounding the abnormality to determine if characteristics of the abnormality warrant further investigation and treatment. However, excised tissue used for X-ray imaging may be amorphous, may lose anatomical registration at the margins and may adopt a shape different from that when present within the body. This may make it difficult to easily identify abnormalities, irregularities, malformations, or other items of interest in the excised tissue.

In the medical industry it is advantageous to provide traceability for a specimen throughout its lifetime to clearly identify the specimen, understand the origin of the specimen, procedures, testing and imaging that has previously occurred, planned procedures, testing, and imaging, and the results of all activities performed in relation to the specimen.

Further limitations and disadvantages of conventional and traditional approaches will become apparent to one of skill in the art through comparison of such systems with some aspects of the present disclosure as set forth in the present application below with reference to the drawings.

SUMMARY

It would be advantageous to provide a cabinet x-ray system and method for maintaining specimen shape, geometry and integrity during imaging and for providing a means for the unique identification of specimens for traceability.

The disclosed embodiments are directed to a means to place excised tissue into a unique device capable of maintaining the specimen in its original shape while taking both optical as well as a series of x-ray images at several positions such that a tomographic representation can be created which reflects the 3-dimensional volume of the tissue with accuracy similar to the 3-dimensional aspect prior to removal from the patient.

When employed, excised tissue specimens would be uniquely identified and maintained in a shape approximating the shape before excision, in a closed system capable of preserving tissue integrity while a series of x-ray images were taken for tomographic reconstruction and a series of optical images may be taken for optical analysis.

An aspect of the disclosed embodiments is directed to a specimen platform for maintaining specimen geometry and traceability including a specimen holder having a specimen receptacle comprising a flexible X-ray and optically transparent material, configured to conform an excised specimen to a shape of the specimen before excision, and a specimen receptacle support attached to the specimen receptacle, and a frame configured to hold the specimen receptacle support.

The specimen platform may include an RFID tag attached to the specimen receptacle support, the RFID tag storing a unique identifier for specimen traceability.

The frame may include a plurality of tiered edge structures.

The tiered edge structures may include at least one stepped shaped tier for supporting different size specimen holders.

The specimen receptacle and specimen receptacle support may be constructed of the same material.

The specimen platform may include an enclosure configured to enclose the frame and specimen holder to protect a specimen held in the specimen holder.

The enclosure may have a lid for covering the specimen receptacle.

In another aspect, the disclosed embodiments are directed to a cabinet X-ray imaging system having a sample chamber, an X-ray source configured to emit X-rays through the sample chamber, an X-ray detector configured to detect X-rays passing through a specimen in the sample chamber, and a specimen platform insertable into the sample chamber including a specimen holder further including a specimen receptacle having a flexible X-ray and optically transparent material, configured to conform an excised specimen to a shape of the specimen before excision, and a specimen receptacle support attached to the specimen receptacle, and a frame configured to hold the specimen receptacle support.

In yet another aspect, the disclosed embodiments are directed to a method of operating a cabinet X-ray system including supporting an excised specimen in a specimen holder configured to conform the excised specimen to a pre-excision shape, obtaining a unique identifier pre-assigned to the specimen holder from an RFID tag attached to the specimen holder, storing specimen information and the unique identifier into an RFID database of the cabinet X-ray system, performing imaging operations on the excised specimen supported by the specimen holder, and storing results of the imaging operations with the unique identifier in the RFID database.

It is to be appreciated that all the aforementioned implementation forms can be combined. It has to be noted that all devices, elements, circuitry, units, and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity that performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams.

DETAILED DESCRIPTION

Figure 1:
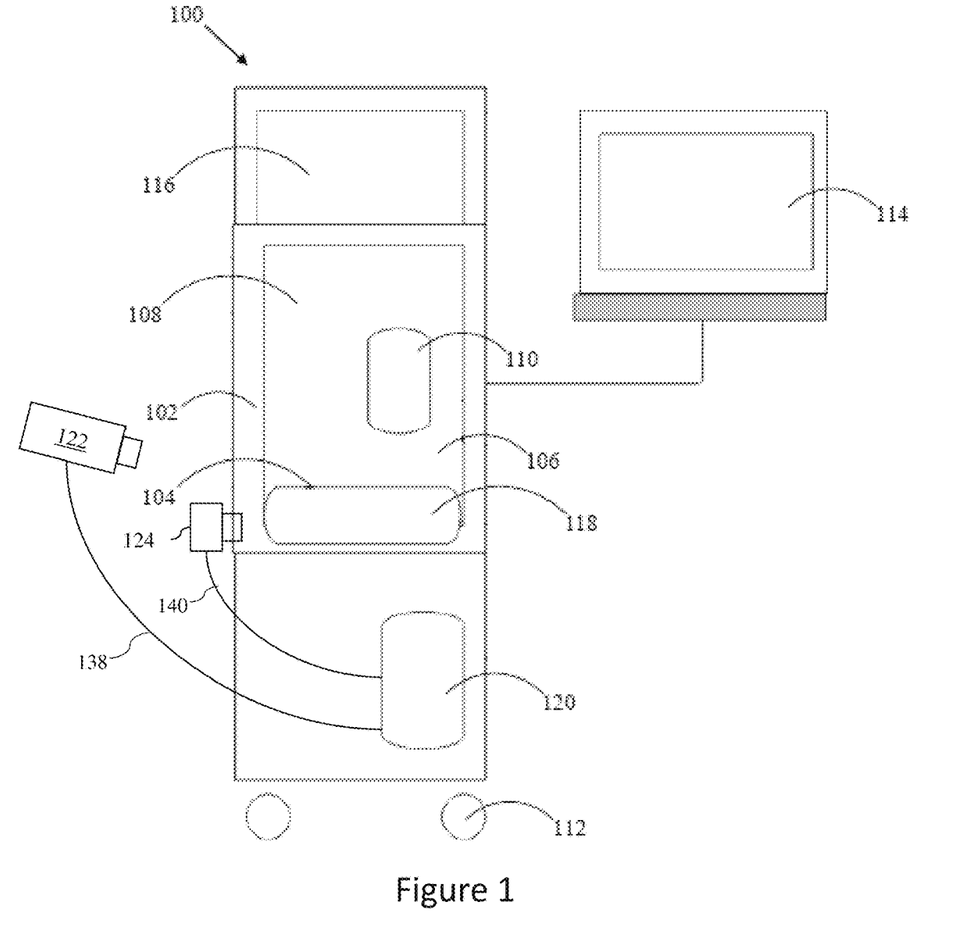
FIG. 1 is an illustration of a cabinet X-ray image system for use with a specimen container according to the disclosed embodiments.

Referring to FIG. 1, there is shown an exemplary cabinet X-ray image system 100 for use with a system and method for maintaining specimen shape, geometry and integrity during imaging and for providing specimen traceability. In particular, the system 100 is configured for non-destructive specimen analysis, including for example, abnormalities, irregularities, malformations, or other items of interest in excised tissue. It should be understood that the system 100 can be employed for non-destructive testing, pathological procedures, radiographic analyses, and other types of specimen analysis.

The term "specimen" as used herein relates to a type of organic sample, for example, human or animal tissue, a human or animal body part, an artificial or lab grown organ or tissue, an insect, an animal commonly used in a laboratory, a biopsy sample, or other suitable organic sample, and also to a type of inorganic sample, for example, teeth, a kidney stone, a gallstone, or other suitable inorganic sample. It will be appreciated by a person skilled in the art that the specimen may be any type of material suitable for X-ray analysis.

The cabinet X-ray system 100 includes a cabinet 102 with a sample chamber 104, a door 106, an interior chamber 108, an opening 110 for viewing the interior chamber 108, wheels 112, a display 114, an X-ray source 116, an X-ray detector 118, a controller 120, an optical camera 122, and an RFID reader 124.

The cabinet 102 provides an enclosed structure comprising a walled enclosure surrounding the interior chamber 108 that is constructed such that X-rays from the X-ray source 116 can be safely made incident upon the specimen without causing leakage of the X-rays outside the cabinet 102.

The cabinet 102 comprises a walled enclosure surrounding the interior chamber 108, and may be fabricated using lead sheet, a lead based alloy, or other suitable X-ray shielding material. In some embodiments, the cabinet 102 may be mounted on the wheels 112 to allow convenient portability. It should be understood that the cabinet 102 may be mounted on any suitable base or transport mechanism, for example, wheeled tracks, an automated guided robot, or any suitable stage to enable free movement of the cabinet 102.

The interior chamber 108 comprises an interior space around the sample chamber 104, and the sample chamber 104 is configured to enclose a specimen platform 200, described below, for maintaining specimen shape, geometry and integrity during imaging and for providing specimen traceability, according to the disclosed embodiments.

The door 106 may be movable to provide access to the interior chamber 108 and the sample chamber 104, and may include the opening 110, which may be a transparent window for viewing the interior chamber 108.

The display 114 may be implemented as a monitor that allows convenient viewing of X-ray images as well as any data processing output. Optionally, the display 114 can be operably coupled to one or more input devices such as a keyboard and mouse. In some embodiments, the display 114 may can be implemented as a touchscreen device. For example, the display 114 can be implemented as a liquid crystal display (or LCD) screen, a cathode-ray tube (or CRT) display, thin-film-transistor liquid-crystal display (or TFT LED), a plasma display, a light emitting diode (or LED) display, one or more fluorescent devices and the like, and may be a part of a laptop computer, a minicomputer, a tablet computer and the like.

Optionally, the display 114 may be mounted on an articulating arm that may be operably coupled to the cabinet 102. Such an articulating arm may be extended or contracted to enable convenient viewing of images on the display 114.

The X-ray source 116 may be an X-Ray diffraction, X-Ray fluorescence, Beryllium window, ceramic, metal ceramic, or any other suitable X-ray tube configured to emit X-rays toward the specimen, and in some embodiments, may be located in an upper portion of the cabinet 102.

The X-ray detector 118 may be a scintillation detection or a gas filled detector, and may be implemented as a charge integrating device, including but not limited to, a complementary metal-oxide-semiconductor (CMOS) device, direct or indirect detection flat panels, an amorphous silicon device, an amorphous selenium device, charge-coupled devices, or any suitable detector configured to detect the X-rays emitted by the X-ray source 116. The X-ray detector 118 may generally be located in line with the X-ray source 116.

The sample chamber 104 may be located between the X-ray source 116 and the X-ray detector 118, and may generally be configured to enclose the specimen platform 200 described below, according to the disclosed embodiments.

The controller 120 can be implemented as any device, assembly, or part of an assembly that controls an operation such that the controller 120 receives input signals, processes the received input signals and generate output signals in response to the processed input signals. The controller 120 may include a digital processor, a memory, an analogue circuit and/or a combination of the same. For example, the controller 120 can be implemented as integrated circuits included in a computer, a controller, a microcontroller, a microcomputer, a programmable logic controller, an application specific integrated circuit, an application-specific processor, digital signal processors, application specific integrated circuits, field programmable gate arrays and/or any other programmable circuitry.

The controller may generally be configured to control, store, and process data, and may be configured to control emission of X-rays from the X-ray source 116, subsequent collection and compilation of data received from the X-ray detector 118, as well as displaying the resulting images on the display 114. The controller 120 may be configured to selectively energize the X-ray source 116 to emit X-rays towards a specimen supported by the specimen platform 200 and the X-ray detector 118. The controller 120 may also be configured to control the X-ray detector 118 to collect the X-rays that pass through the specimen when the X-ray source 116 is energized.

The controller 120 may be configured to communicate with various components of the system 100, such as the X-ray source 116 and the X-ray detector 118, in any suitable manner, including hardwired and wireless communication. For example, the controller 120 may be configured to communicate with the components of the system 100 over a wireless network, such as a Bluetooth, Local Area Network, or Wide Area Network, including the Internet.

The controller 120 may include a structure and/or module that includes programmable and/or non-programmable components configured to store, process and/or share information and/or signals for generating an X-ray image of a specimen. The controller 120 may have elements, such as a display, control buttons or joysticks, processors, memory and the like. Typically, the controller 120 is operable to perform one or more operations for managing one or more components of the system 100. In the present examples, the controller 120 may be coupled with one or more components such as memory, a network adapter and the like, to store, process and/or share information with other computing components, such as, a remote server, a remote gateway, a network, or a database.

Optionally, the controller 120 may be supplemented with additional computation system, such as neural networks, and hierarchical clusters of pseudo-analog variable state machines implementing artificial intelligence algorithms. Optionally, the controller 120 may be implemented as a computer program that provides various services (such as, database service) to other devices, modules or apparatuses. Examples of the controller 120 include, but are not limited to, a workstation, a desktop computer, a mobile computer, a laptop computer, a netbook computer, a tablet computer, a smart phone, a personal digital assistant (PDA), and the like.

Figure 2:
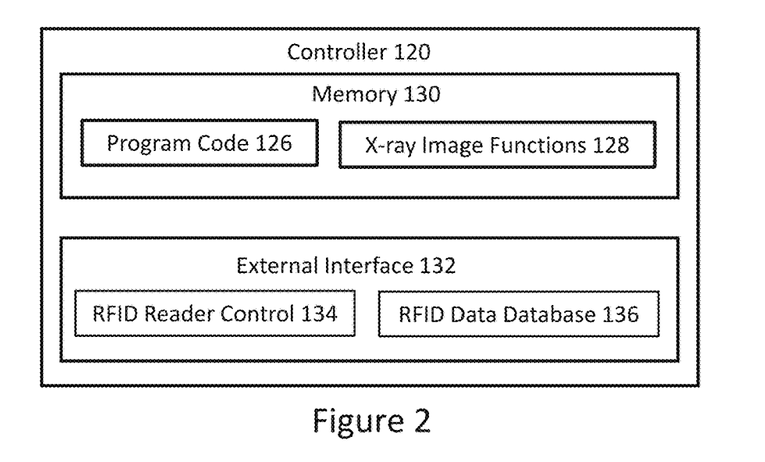
FIG. 2 illustrates an exemplary controller for the cabinet X-ray system.

FIG. 2 illustrates a block diagram of the controller 120. The controller may include computer readable program code 126 stored on at least one non-transitory computer readable medium for carrying out and executing the processes described herein. In at least one embodiment, the computer readable program code 126 may implement the various functions 128 of the X-ray image system described herein. The computer readable medium may be a memory 130, and in alternate aspects, the computer readable program code 126 may be stored in memories external to, or remote from, the controller 120. The memory 130 may include magnetic media, semiconductor media, optical or voice/audio media, or any media which is readable and executable by a computer.

The controller 120 may also include an external interface 132. In some embodiments, the external interface 132 may include a keyboard, mouse, touch screen, display camera, microphone, voice recognition system, or any device or combination of devices suitable for providing a user with an ability to interact with the X-ray image system 100. In some embodiments, the at least one external interface 132 may include a wireless interface, for example, Wi-Fi 802.11, Bluetooth 802.15, cellular 2G-6G, or any other suitable wireless interface, a wired interface, for example, Ethernet, Universal Serial Bus (USB), Serial Advanced Technology Attachment (SATA) or any other suitable wired interface. The external interface 310 may also include an RFID reader control 134 for collecting and processing data from the RFID reader 124 and an RFID data database 136 for storing RFID data and associating unique RFID data with specific specimens.

Returning to FIG. 1, the system 100 includes an optical camera 122 as mentioned above. The optical camera 122 may be configured to capture an optical image of the specimen. The terms "camera" or "optical camera" as used herein throughout the disclosure refers to an optical instrument for capturing images in black and white, greyscale or color using reflected and/or emitted wavelengths of the electromagnetic spectrum, for example, visible light or fluorescent light, from an object, similar to a photograph or that which could be viewed by a human eye, using an electronic light-sensitive sensor array. These terms may include such instruments producing images in standard resolution or high definition as well as a digital camera that can directly capture and store an image in computer-readable form using an array of electronic light-sensitive elements, such as, semiconductor photo-sensors that produce a light-intensity-dependent electronic signal in response to being illuminated.

The optical camera 122 may be employed to capture an optical image, for example, in black and white, greyscale, or color, and in some embodiments in real-time, of the specimen. In at least one embodiment, the optical camera 122 may be a high-definition (HD) optical camera that is configured to capture an HD optical image.

In some embodiments, the X-ray unit may include a swing arm operably coupled to the X-ray source 116. The swing arm is configured to change an orientation of the X-ray source 116 with respect to the X-ray detector 118. The controller 120 is coupled to the swing arm such that the swing arm and consequently, the orientation of the X-ray detector 118 can be arranged to monitor/analyse specimen from multiple angles to capture details, which may not be clearly elucidated from single angle.

Figure 3:
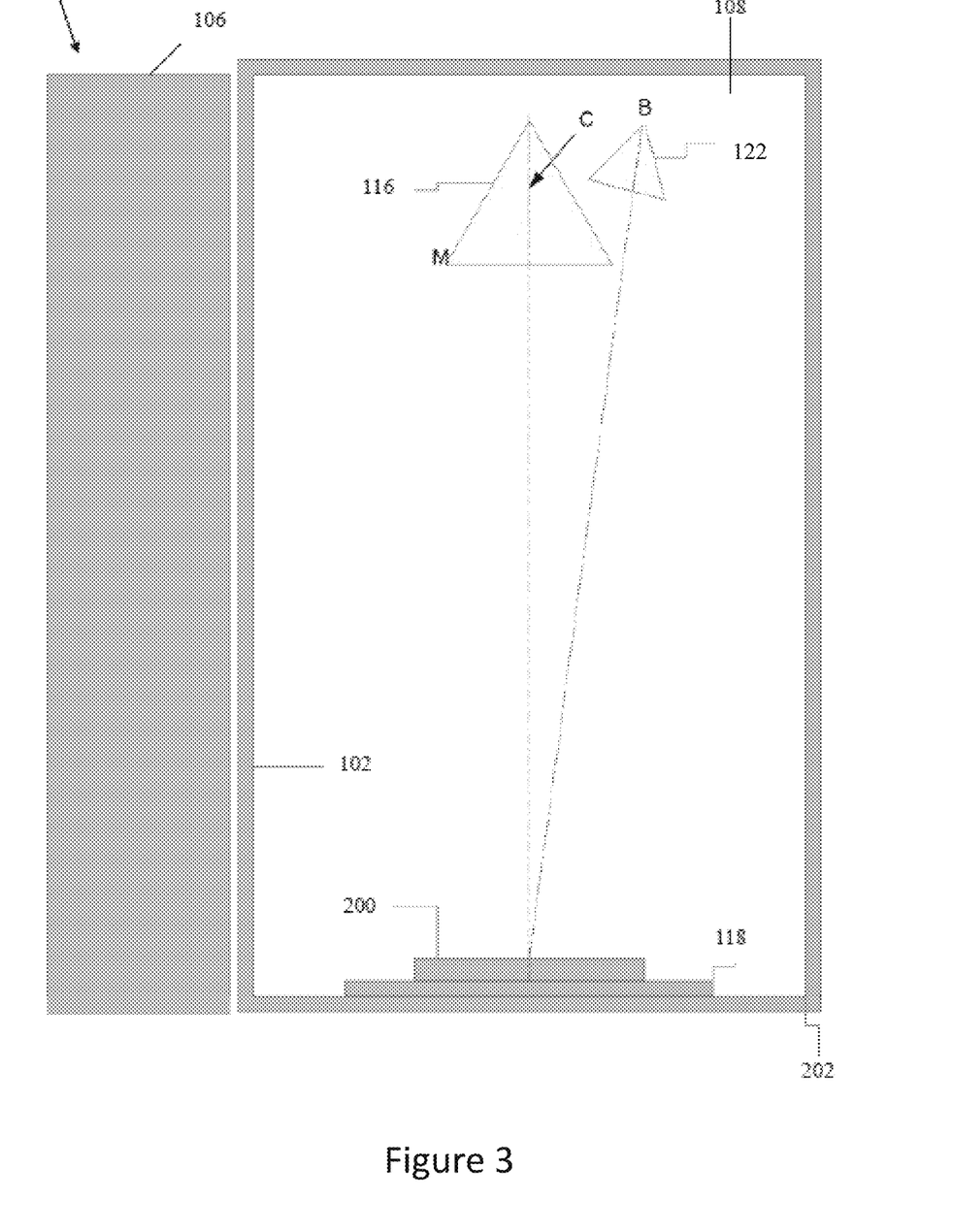
FIG. 3 shows a schematic depiction of an X-ray system for radiography using a single position X-ray source.

FIG. 3 shows a schematic depiction of an X-ray system for radiography using a single position X-ray source, in accordance with the disclosed embodiments. As shown, the X-ray source 116 may be located at an orientation of 0° with respect to the specimen platform 200 on which the specimen is arranged. The X-ray source 116 may be configured to move from a back of the cabinet 102 towards a front of the cabinet 102. The X-ray detector 118 may be disposed behind the specimen platform 200, such as, on a base 202 of the cabinet 102. Optionally, the X-ray source 116 can be configured to cause emission of X-rays with a spread of 0 kVp to approximately 50 kVp. For example, the system 100 may employ automatic exposure control (or AEC) to ascertain an optimal setting for each specimen.

In an embodiment, the X-ray source 116 can be configured to rotate 3600 with respect to the specimen so that specimen can be analysed from multiple angles. In an alternative embodiment, the X-ray source 116 can be mounted on a robotic arm having three degrees of freedom to analyse the specimen over multiple view angles. As the X-ray source 116 rotates, the X-ray detector 118 may also reposition to capture X-ray photons. The X-ray source 116 may be arranged to bombard the specimen with an X-ray beam (denoted as "c") from multiple angles. The X-ray beam may be widened using a known device "M" (e.g., a collimator, diffraction grating, crystal, etc.) to expose the entire surface of the specimen.

Figure 4:
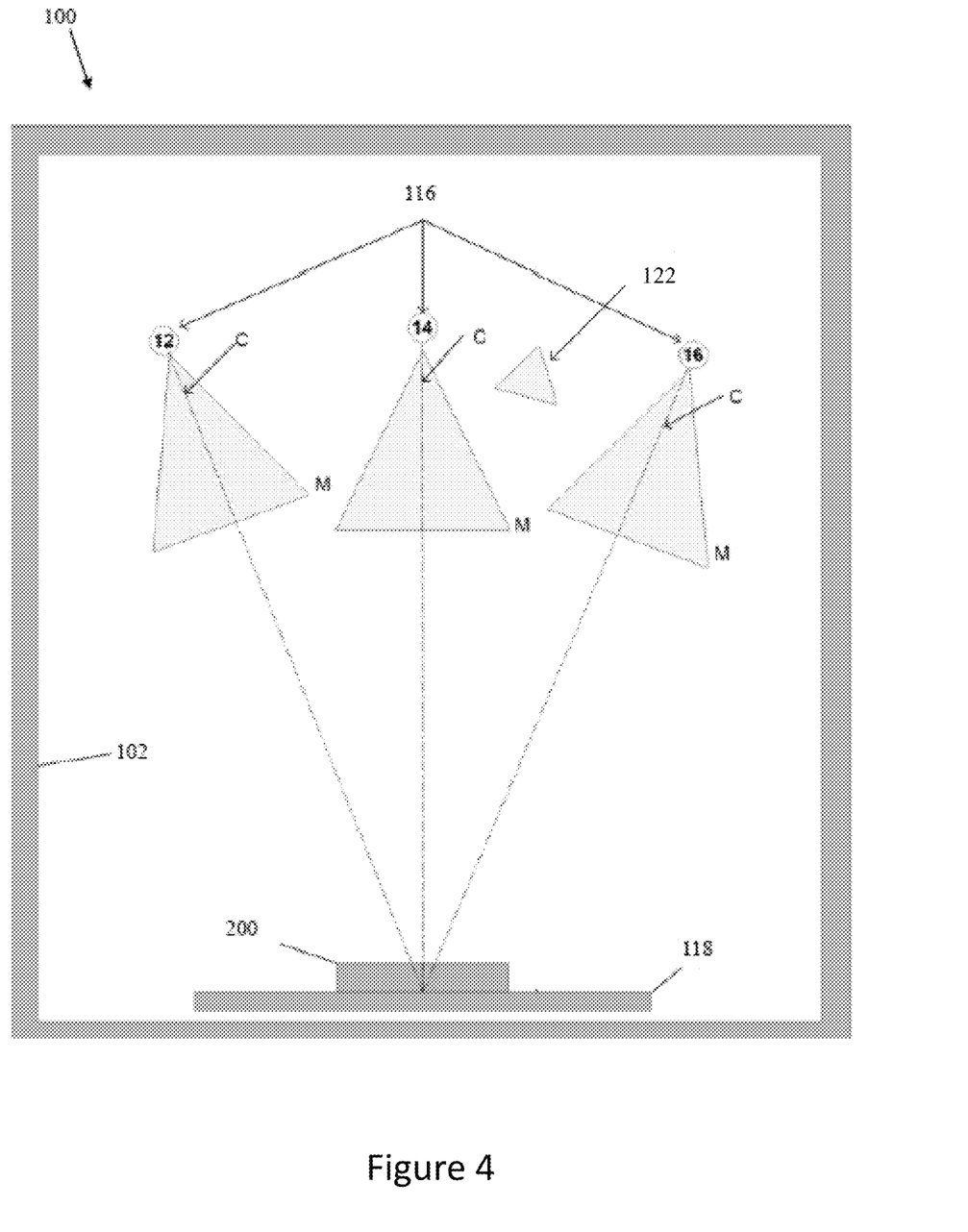
FIG. 4 shows a schematic depiction of an X-ray system for radiography using a multiple position X-ray source.

FIG. 4 shows a schematic depiction of an X-ray system for radiography using a multiple position X-ray source, in accordance with an embodiment of the present disclosure. The X-ray source 116 can be coupled to the swing arm that can be arranged to orient the X-ray detector 116 at different positions (e.g., 12, 14 and 16). The X-ray detector 118 can be arranged to receive X-ray from distinct angles to capture details of specimen, which may not be clearly depicted from single angle.

In one or more embodiments, the controller 120 is configured to distinguish among different materials of the specimen by training or employing an artificial intelligence algorithm. For example, the controller 120 is configured to analyse kVp (to tube voltage), mA (exposure time product) and filtration. The controller 120 can also be configured such that the kVp and mA can be adjusted to control image quality and patient dose.

Returning to FIG. 1 a connection 138 between the optical camera 122 and the controller 120 may be implemented to enable the controller 120 to control operation of the optical camera 122, and a connection 140 between the RFID reader 134 and controller 120 may be implemented to enable the controller 120 to control operation of the RFID reader 124 using the RFID reader control 134. The connections 138, 140 may be wired or wireless.

The optical camera 122 may be implemented as a real-time camera that is configured to capture an optical image of the specimen concurrently or at substantially the same time as acquisition of an X-ray image. In some embodiments, the optical camera 240 may be incorporated into the cabinet 102. The optical camera 240 may be operably coupled to the controller 120 and may collect and send optical images the controller 120 via the connection 138. The optical camera 122 can capture a visible light or other electromagnetic wavelength reflected or emitted by the specimen or portions thereof, for example, through the use of fluorescent or other markers using a suitable light source where required.

The RFID reader 124 may include an antenna that transmits electromagnetic energy in the form of RF radio waves to the sample chamber 104. An RFID tag may be present on the specimen holder 204 and may operate to receive the electromagnetic energy and, in response, circuitry in the tag may be energized and modify a field of the electromagnetic energy, or send a reply RF or radio wave signal, that encodes the electromagnetic energy or signal with a code unique to the RFID tag. The reply field or signal may be received by the RFID reader 124 and directed to the controller 120 for further processing of the RFID code. In some embodiments the RFID tag and reader may operate at a frequency of 860-960 MHz.

In some embodiments, the specimen supported by the specimen platform 200 may be from an excised tissue, an organ and a bone. For example, the specimen may be an excised breast tissue that is suspected to be cancerous. Consequently, the specimen can be processed by the cabinet X-ray system 100 to detect a presence or absence of cancerous tumours within the excised tissue.

Figure 5:
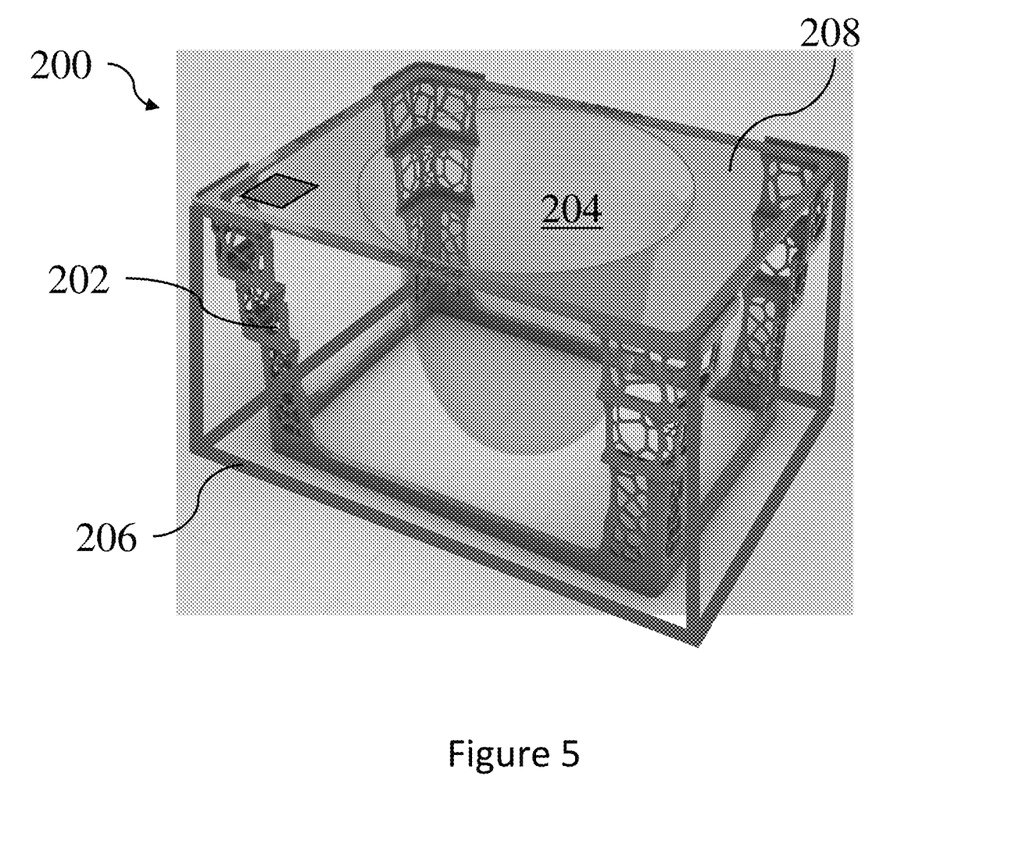
FIG. 5 illustrates an example of a specimen platform according to the disclosed embodiments.

FIG. 5 illustrates an example of the specimen platform 200 according to the disclosed embodiments. The specimen platform 200 includes a frame 202, a specimen holder 204, an enclosure 206, and a lid 208. The frame 202, specimen holder 204, enclosure 206, and lid 208 may be constructed of an optical and X-ray transparent or radiolucent material, for example, glass fiber, carbon fiber, thermoset materials, thermoplastic materials, and thermoplastic resins with carbon fiber reinforcement. In particular, the material of the specimen holder 204 may be selected to ensure no chemical reaction between the specimen holder and the specimen.

Figure 6:
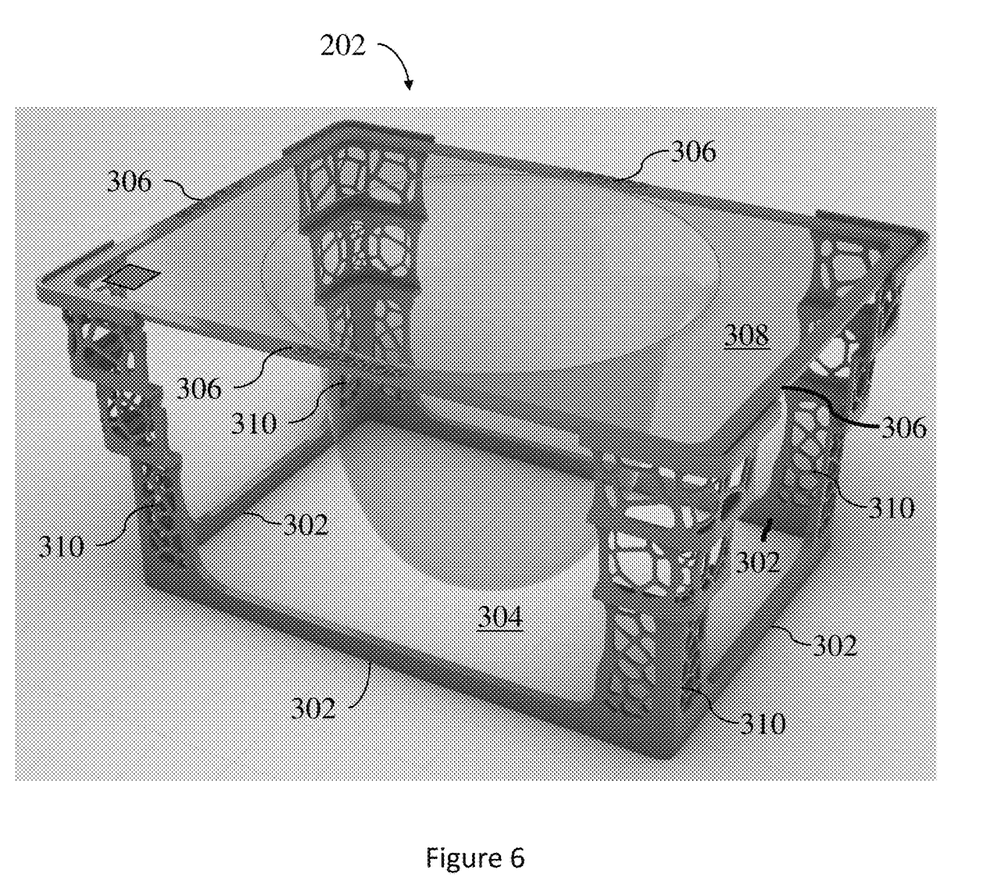
FIG. 6 depicts an example of a frame of the specimen platform.

An example of the frame 202 is shown in FIG. 6. The frame 202 may have a generally cuboid or hexahedron shape with lower edges 302 forming a frame bottom 304, upper edges 306 forming a frame top 308, and four tiered edge structures 310 connecting the corners of the frame bottom 304 and frame top 308. The frame bottom 304 may have a smaller surface area than the frame top 308, and the tiered edge structures 310 may extend outward from the frame bottom 304 to the frame top 308.

Figure 7:
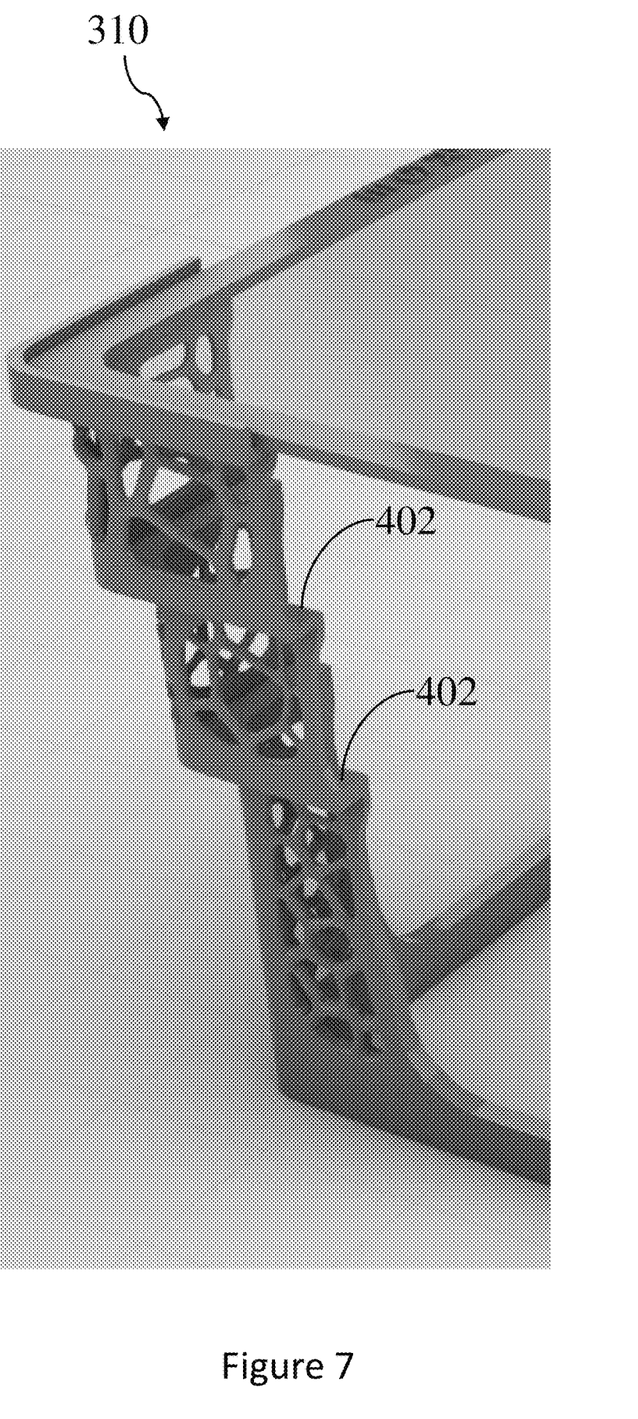
FIG. 7 illustrates an enlarged view of an exemplary tiered edge structure of the frame.

FIG. 7 illustrates an enlarged view of an exemplary tiered edge structure 310 of the frame 202. The frame 202 is configured to support one or more specimen holders 204. In particular, the tiered edge structure 310 may include one or more step shaped tiers 402 shaped to support corners of different size specimen holders 204.

Returning to FIG. 5, the enclosure 206 may include the lid 208 and may generally enclose the frame 202 and the specimen holder 204. The enclosure may be airtight and may operate to protect the specimen during transport and imaging.

Figure 8A:
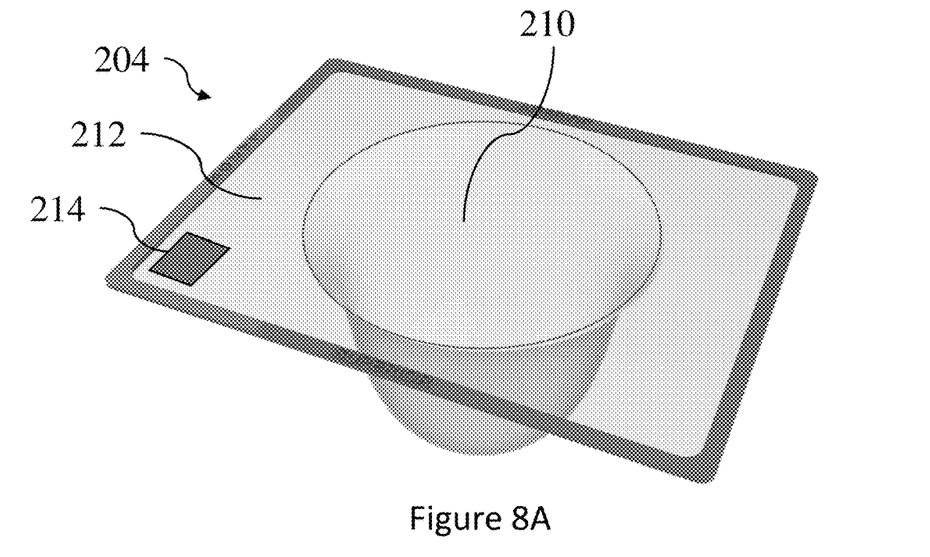
FIGS. 8A-8C show exemplary specimen holders.
Figure 8B:
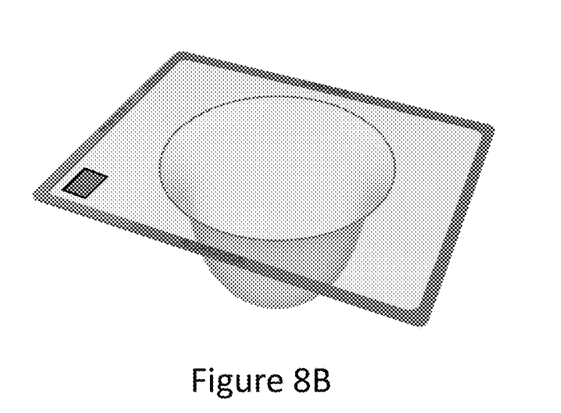
Figure 8C:
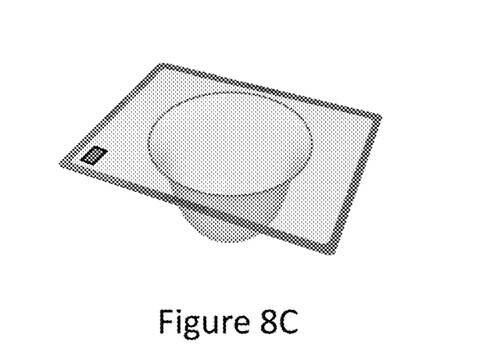

FIGS. 8A-8C show exemplary specimen holders 204. The specimen holders 204 include a specimen receptacle 210, a specimen receptacle support 212, and an RFID tag 214 mounted on the specimen receptacle support 212.

The specimen receptacle 210 may be constructed of a flexible X-ray and optically transparent material, and is configured to conform the shape of an excised specimen to the shape of the specimen before excision. The specimen receptacle support 212 may be a rigid rectangular support with dimensions such that corners of the specimen receptacle support 212 fit into the step shaped tiers 402 of the tiered edge structures 310.

The specimen receptacle support 212 may be attached to the specimen receptacle 210, or in some embodiments, the specimen receptacle 210 may be integral with the specimen receptacle support 212. Furthermore, the specimen receptacle 210 may comprise an X-ray and optically transparent material different from that of the specimen receptacle support 212, or in some embodiments, the specimen receptacle 210 may comprise the same X-ray and optically transparent material as the specimen receptacle support 212.

The RFID tag 214 may include a microchip, an antenna and, in some embodiments, a power source such as a battery. When the RFID reader transmits electromagnetic energy, the RFID tag 214 operates to receive the electromagnetic energy and, in response, may modify a field of the electromagnetic energy, or send a reply RF or radio wave signal, with unique data encoded in the electromagnetic energy or signal that represents an identification of the specimen holder 204. Thus, the data unique to the RFID tag 214 and emitted by the RFID tag 214 identifies the specimen holder 204 and also operates to identify the specimen.

Referring again to FIGS. 8A-8C, the specimen holders 204 may have different sizes to accommodate different size specimens while maintaining the specimens, and the different size specimen receptacle supports 212 may have dimensions such that corners of the different size specimen receptacle supports 212 fit into different sets of the step shaped tiers 402 of edge structures 310. The specimen holders 204 provide for maintaining the geometry of a variety of specimen sizes during imaging.

Figure 9:
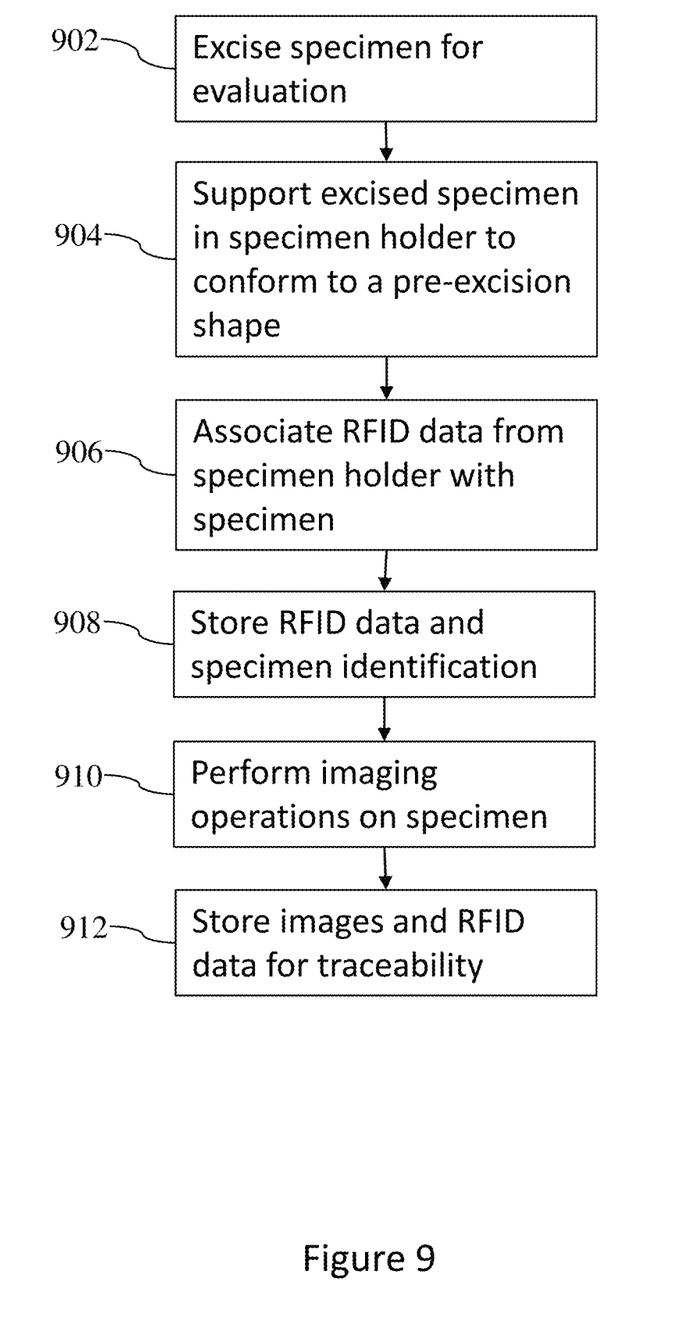
FIG. 9 illustrates a method of operation of the disclosed embodiments.

FIG. 9 illustrates a method of operation 900 of the disclosed embodiments. In operation, a specimen may be excised for diagnostic evaluation, for example, for cancers or other abnormalities, as shown in block 902. Once excised, the specimen may be supported in a specimen holder 204 to conform to a pre-excision shape, as shown in block 904. The RFID data may be obtained from the RFID tag and then may be associated with the specimen, as shown in block 906. For example, a unique identifier may be pre-assigned to the specimen holder 204 and stored on the RFID tag 214. A technician may deposit a specimen in the specimen holder 204 and store specimen information and the unique identifier into the RFID database 136 through the external interface 132, as shown in block 908. Imaging operations may be performed on the specimen as shown in block 910, and the imaging results and unique identifier may be stored in the RFID database 136.

The following reference numbers are used in the drawings:
- 100 X-ray image system
- 102 cabinet
- 104 sample chamber
- 106 door
- 108 interior chamber
- 110 opening
- 112 wheels
- 114 display
- 116 X-ray source
- 118 X-ray detector
- 120 controller
- 122 optical camera
- 124 RFID reader
- 126 program code
- 128 X-ray system functions
- 130 memory
- 132 external interface
- 134 RFID reader control
- 136 RFID identification database
- 138 camera connection
- 140 RFID reader connection
- 200 specimen platform
- 202 frame
- 204 specimen holder
- 206 enclosure
- 208 lid
- 210 specimen receptacle
- 212 specimen receptacle support
- 214 RFID tag
- 302 frame lower edges
- 304 frame bottom
- 306 frame upper edges
- 308 frame top
- 310 tiered edge structures
- 402 stepped tiers Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A specimen platform for maintaining specimen geometry and traceability comprising:
    a specimen holder comprising:
        a specimen receptacle comprising a flexible X-ray and optically transparent material, configured to conform an excised specimen to a shape of the specimen before excision; and
        a specimen receptacle support attached to the specimen receptacle; and
    a frame configured to hold the specimen receptacle support, the frame comprising a plurality of tiered edge structures for supporting different size specimen holders.

2. The specimen platform of claim 1, comprising an RFID tag attached to the specimen receptacle support, the RFID tag storing a unique identifier for specimen traceability.

3. The specimen platform of claim 1, wherein the tiered edge structures comprise at least one stepped shaped tier for supporting the different size specimen holders.

4. The specimen platform of claim 1, wherein the specimen receptacle and specimen receptacle support comprise the same material.

5. The specimen platform of claim 1, comprising an enclosure configured to enclose the frame and specimen holder to protect a specimen held in the specimen holder.

6. The specimen platform of claim 5, wherein the enclosure comprises a lid for covering the specimen receptacle.

7. A cabinet X-ray imaging system comprising:
    a sample chamber;
    an X-ray source configured to emit X-rays through the sample chamber;
    an X-ray detector configured to detect X-rays passing through a specimen in the sample chamber; and
    a specimen platform insertable into the sample chamber comprising:
        a specimen holder comprising:
            a specimen receptacle comprising a flexible X-ray and optically transparent material, configured to conform an excised specimen to a shape of the specimen before excision; and a specimen receptacle support attached to the specimen receptacle; and a frame configured to hold the specimen receptacle support, the frame comprising a plurality of tiered edge structures for supporting different size specimen holders.

8. The cabinet X-ray imaging system of claim 7, wherein the specimen platform comprises an RFID tag attached to the specimen receptacle support, the RFID tag storing a unique identifier for specimen traceability.

9. The cabinet X-ray imaging system of claim 8, comprising an RFID database for storing the unique identifier and information about a specimen associated with the unique identifier.

10. The cabinet X-ray imaging system of claim 7, wherein the plurality of tiered edge structures comprise at least one stepped shaped tier for supporting the different size specimen holders.

11. The cabinet X-ray imaging system of claim 7, wherein the specimen receptacle and specimen receptacle support comprise the same material.

12. The cabinet X-ray imaging system of claim 11, wherein the enclosure comprises a lid for covering the specimen receptacle.

13. The cabinet X-ray imaging system of claim 7, wherein the specimen platform comprises an enclosure configured to enclose the frame and specimen holder to protect a specimen held in the specimen holder.

14. A method of operating a cabinet X-ray system comprising:

supporting an excised specimen in a specimen holder comprising:
- a specimen receptacle comprising a flexible X-ray and optically transparent material, configured to conform the excised specimen to a pre-excision shape; and
- a frame configured to hold the specimen receptacle support, the frame comprising a plurality of tiered edge structures for supporting different size specimen holders;

obtaining a unique identifier pre-assigned to the specimen holder from an RFID tag attached to the specimen holder;

storing specimen information and the unique identifier into an RFID database of the cabinet X-ray system;

performing imaging operations on the excised specimen supported by the specimen holder; and storing results of the imaging operations with the unique identifier in the RFID database.

* * * * *